(12) United States Patent
Oesterling et al.

(10) Patent No.: US 8,754,766 B2
(45) Date of Patent: Jun. 17, 2014

(54) PROVIDING EMERGENCY COMMUNICATION SERVICES USING A VEHICLE TELEMATICS UNIT AND A MOBILE DEVICE

(75) Inventors: Christopher L. Oesterling, Troy, MI (US); Jeffrey M. Stefan, Clawson, MI (US)

(73) Assignee: General Motors LLC, Detroit, MI (US)

( * ) Notice: Subject to any disclaimer, the term of this patent is extended or adjusted under 35 U.S.C. 154(b) by 277 days.

(21) Appl. No.: 13/299,717

(22) Filed: Nov. 18, 2011

(65) Prior Publication Data

US 2013/0130639 A1 May 23, 2013

(51) Int. Cl.
*G08B 1/08* (2006.01)
(52) U.S. Cl.
USPC .................. 340/539.11; 340/539.1; 340/436; 340/438; 455/404.1
(58) Field of Classification Search
USPC ............... 340/539.1, 539.11, 539.22, 539.26, 340/425.5, 435, 436, 438, 313, 903; 455/404.1, 404.2, 422.1; 705/45; 704/8
See application file for complete search history.

(56) References Cited

U.S. PATENT DOCUMENTS

| | | | | |
|---|---|---|---|---|
| 6,340,928 B1* | 1/2002 | McCurdy | ...................... | 340/436 |
| 7,574,195 B2* | 8/2009 | Krasner et al. | ............. | 455/404.2 |
| 7,580,697 B2* | 8/2009 | Lappe et al. | ............... | 455/404.1 |
| 2008/0272906 A1* | 11/2008 | Breed | ...................... | 340/539.11 |
| 2011/0201302 A1* | 8/2011 | Hatton | ....................... | 455/404.2 |
| 2012/0252431 A1* | 10/2012 | Gee et al. | ................... | 455/422.1 |

FOREIGN PATENT DOCUMENTS

EP 2263533 12/2010

\* cited by examiner

*Primary Examiner* — Anh V La
(74) *Attorney, Agent, or Firm* — Anthony Luke Simon; Reising Ethington P.C.

(57) ABSTRACT

A system and method for providing a communication about a potential vehicular crash via a vehicle telematics unit and a personal mobile device. In one embodiment, the method carried out by the system receives a notification of a potential vehicular crash from a personal mobile device located at the vehicle. Then, the method confirms the occurrence of the crash by the vehicle telematics unit. Later, the method provides a wireless communication about the crash to one or more parties.

19 Claims, 2 Drawing Sheets

PROVIDING EMERGENCY COMMUNICATION SERVICES USING A VEHICLE TELEMATICS UNIT AND A MOBILE DEVICE

TECHNICAL FIELD

The present invention relates generally to vehicle telematics services and, more specifically, to communication between vehicles and mobile devices about providing emergency communication about an occupant of the vehicle to a third party.

BACKGROUND OF THE INVENTION

In case of a vehicular crash, providing an emergency communication is highly desirable. However, emergency communication should avoid false alerts and request help in a timely fashion. In addition, emergency communication should employ a minimum number of systems and modules of a vehicle since some of them may be damaged in the crash, in order to provide the emergency communication in the first place.

SUMMARY OF THE INVENTION

According to one embodiment of the invention, there is presented a method for providing a communication about a potential vehicular crash via a vehicle telematics unit and a personal mobile device, comprising the steps of: (a) receiving a notification of a potential vehicular crash from a personal mobile device located at the vehicle; (b) confirming the occurrence of the crash by the vehicle telematics unit; and (c) providing a wireless communication about the crash to one or more parties.

According to another embodiment of the invention, there is presented a method for providing a communication about a potential vehicular crash via a vehicle telematics unit and a personal mobile device, comprising the steps of: (a) monitoring for any vehicular crash via a personal mobile device located at the vehicle; (b) detecting a shock event by the mobile device; (c) determining that a potential vehicular crash has occurred based on the detected event; (d) establishing short range wireless communication between the mobile device and the vehicle telematics unit; (e) sending a notification about the potential vehicular crash from the mobile device to the vehicle telematics unit via the established short range wireless communication; (f) accessing data from one or more vehicle system modules concerning the potential vehicular crash; (g) confirming the vehicular crash using the accessed data; (h) obtaining vehicular crash data by the vehicle telematics unit; (i) providing the vehicular crash data to the mobile device from the vehicle telematics unit via the established short range wireless communication; and (j) performing an emergency wireless communication to one or more parties.

According to another embodiment of the invention, there is presented a telematics unit for using with a personal mobile device to provide a communication about a potential vehicular crash, wherein the vehicle telematics unit includes a processor and computer readable memory that contains instructions that are executed by the processor to carry out the following steps: (a) receiving a notification of a potential vehicular crash from a personal mobile device located at the vehicle; (b) confirming the occurrence of the crash by the vehicle telematics unit; and (c) providing a wireless communication about the crash to one or more parties.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENT(S)

The method described below provides a communication about a potential vehicular crash via a vehicle telematics unit and a personal mobile device. In one embodiment, the method receives a notification of a potential vehicular crash from a personal mobile device located at the vehicle. Then, the method confirms the occurrence of the crash by the vehicle telematics unit. Later, the method provides a wireless communication about the crash to one or more parties.

Communications System—

Figure 1:
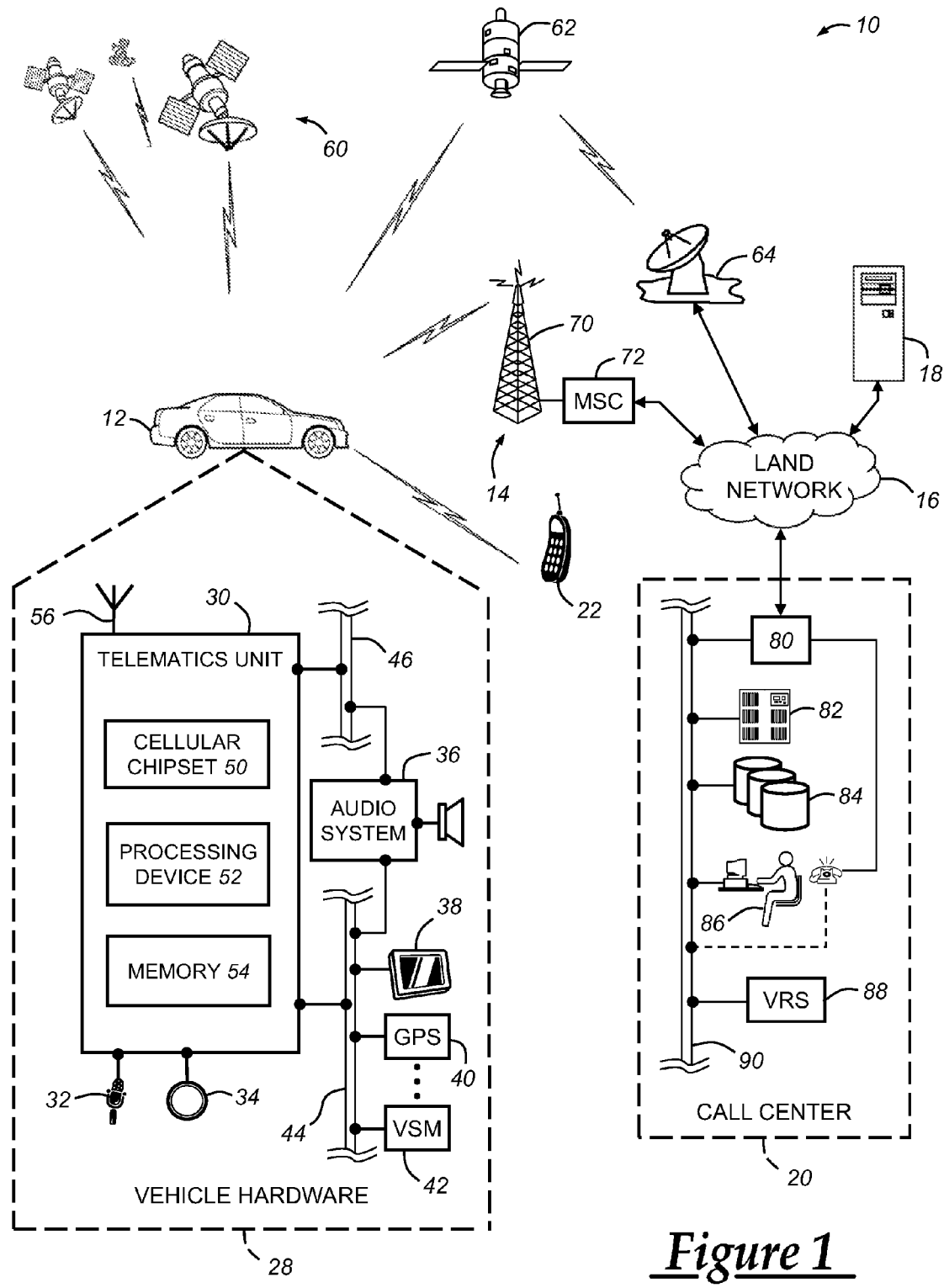
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Apart from computer 18, other types of remotely located processing devices can be used. For example, a mobile device 22 can be used and can be one of a number of such communication devices used by subscribers. Each mobile device 22 is a processing device that can be used for one or more purposes, such as voice communication, text messaging, email, web browsing, gaming, camera, video recording, sending and receiving photos and videos, audio player (e.g., MP3), radio, GPS navigation, personal organizer, to name but a few. In addition, mobile device 22 can be equipped with one or more accelerometers (e.g., single-axis, multi-axis, etc.) and/or other sensors that measure the acceleration, vibration, shock, and falling of the mobile device. The accelerometer used may be piezoelectric, piezoresistive, capacitive, micro electro-mechanical systems (MEMS), or any other suitable accelerometer. Skilled artisans will recognize that devices other than accelerometer that can determine acceleration, vibration, shock, or falling of a device may be used. In the illustrated embodiment, mobile device 22 is a mobile phone also known as a cell or cellular phone that connects to a cellular network such as system 14. In another embodiment, mobile device 22 can be a personal digital assistant (PDA) that may or may not provide telephony services. Mobile device 22 can employ one of a variety of wireless technology including Bluetooth (e.g. hands-free headset, games, watches, sports sensors, medical devices, etc.), etc. Various other types of suitable processing devices will be apparent to those skilled in the art.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method—

Figure 2:
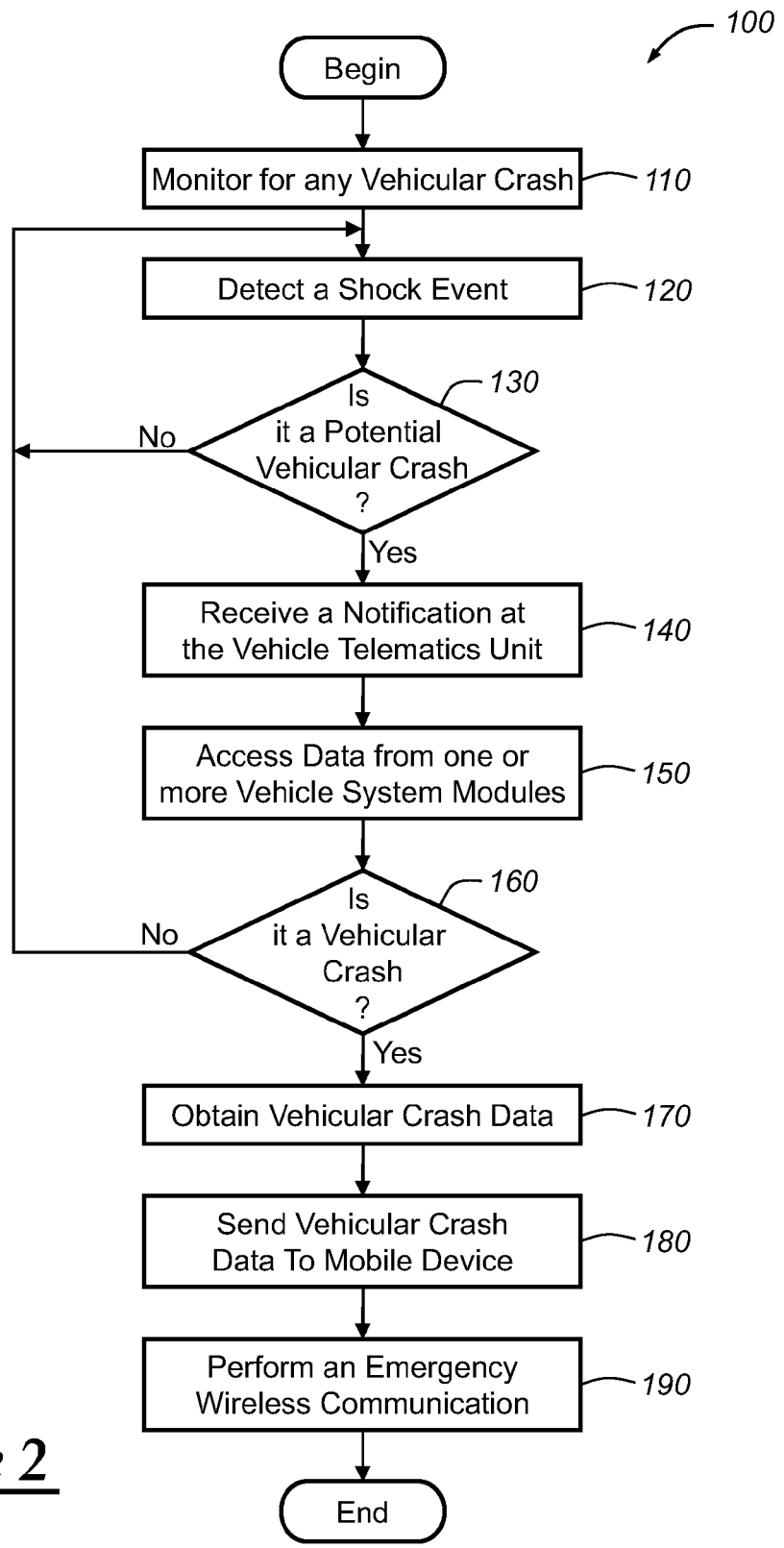
FIG. 2 is a flowchart of an exemplary embodiment of a method for providing a communication about a potential vehicular crash via a vehicle telematics unit and a personal mobile device.

Turning now to FIG. 2, there is an exemplary embodiment of a method 100 for providing a communication about a potential vehicular crash via a vehicle telematics unit and a personal mobile device. The method starts at step 110 and begins by monitoring for any vehicular crash. One or more devices and modules can monitor for any vehicular crash including mobile device 22, vehicle 12's sensors, telematics unit 30, VSMs 42, etc. Specifically, pressure, velocity, acceleration, roll, and/or other sensors located at mobile device 22, telematics unit 30, seatbelt, airbag, safety modules (e.g., rollover system, electronic stability control system (ESC), tire pressure monitoring system (TPMS), antilock braking system (ABS), etc.) and/or other suitable location within vehicle 12. In one embodiment, mobile device 22 monitors for any vehicular crash via its accelerometer and an application running in its background. This step can be triggered in a variety of ways, for instance, in one embodiment, it is triggered after an occupant of vehicle 12 provide a voice command via microphone 32 and/or a manual command via pushbutton 34 to enable monitoring for any vehicular crash. In another embodiment, the step is triggered after one or more vehicle units are operated including opening or closing a door, turning on vehicle 12 ignition system via a start button, turning ignition key, or any other suitable method. In another embodiment, this step is triggered when mobile device 22 is detected in vehicle 12. In another embodiment, this step is triggered when vehicle 12 reaches a certain speed or it is driven for a certain duration of time or number of miles.

Next, at step 120, method 100 detects a shock event. In one embodiment, mobile device 22 detects a shock event via one or more accelerometers or shock sensors. Mobile device 22 can be running an internal software application which is receiving shock event data from one or more shock sensors embedded in mobile device 22. The data can be received on a predetermined time basis (e.g., every few milliseconds, seconds, minutes, etc.), upon occurrence of a shock event, or upon request of the application running on mobile device 22. In one embodiment, upon occurrence of a shock event, the sensor can send a signal to an application running in the mobile device for analysis.

At step 130, method 100 checks if a potential vehicular crash has occurred based on the detected event. In one embodiment, mobile device 22 analyzes the shock event data received in the previous step to determine that a potential vehicular crash has either occurred or did not occur. Mobile device 22 may analyze a single shock event once it occurred or keeps receiving data after receiving the initial informative signal announcing the shock event to confirm that a potential crash has occurred. For example, it can wait for a certain time after mobile device 22 received a shock to eliminate the possibility of that the mobile device is just dropped on the floor of vehicle 12. However, if there is no acceleration, vibration, shock, or any movement condition after a certain period of time has elapsed following the detected shock event then the application may determine that a potential vehicular crash has occurred. In another embodiment, the application may compare the shock event data to a previously stored data obtained via previous tests for different shock scenarios, for example, to determine the possibility of an occurrence of a potential vehicular crash. In another embodiment, the application may compare the intensity of the shock event data to a threshold that was previously determined to decide on the possibility of an occurrence of a potential vehicular crash. Other embodiments are also possible. In case no potential vehicular crash is determined then method 100 loops back to step 120; otherwise, it proceeds to the next step.

At step 140, method 100 receives a notification at the vehicle telematics unit. In one embodiment, telematics unit 30 receives a notification about a potential vehicular crash sent from mobile device 22 via a short range wireless communication such as a bluetooth communication. The short range wireless communication (e.g., bluetooth, WiFi, IEEE 802.11x, etc.) can be established via a request signal sent from mobile device 22 to telematics unit 30. Then, both telematics unit 30 and mobile device 22 can be paired to establish a communication link. In one embodiment, telematics unit 30 has a list of possible mobile devices and their corresponding identifiers which are previously stored, for example, in memory 54. Other actions can be performed at this step including inquiring and determining the location of vehicle 12 via enabling and sending an inquiry command to GPS 40.

At step 150 method 100 accesses data from one or more vehicle system modules.

In response to receiving a notification about the potential vehicular crash (step 140), method 100 initiates checking into this message by accessing data from one or more vehicle system modules 42. In one embodiment, telematics unit 30 accesses data from one or more collision related VSMs 42 such as an advanced automatic crash notification (AACN) system via communication bus 44. In another embodiment, telematics unit 30 accesses data from one or more safety related VSMs 42 including an antilock brake system (ABS), a body control module (BCM), and/or any other related module via communication bus 44. Telematics unit 30 can access the data via either a wired connection or a wireless connection. However, in another embodiment, telematics unit 30 can be equipped with one or more crash or collision detection sensors and in this case can access its own data.

Once method 100 accesses data from one or more vehicle system modules, it can obtain a confirmation that an actual vehicular crash has occurred (step 160). At this step, VSM 42 can further analyze its data or provide a vocal and/or visual message to an occupant of vehicle 12 to confirm the crash if possible. In one embodiment, a confirmation (or a rejection) of an occurrence of a vehicular crash is provided via communication bus 44 from VSM 42. In another embodiment, after accessing its own data, processor 52 of telematics unit 30 either confirms or rejects the occurrence of a vehicular crash.

If a confirmation of a vehicular crash occurrence is provided then method 100 proceeds to the next step; otherwise, method 100 loops back to step 120.

Next, at step 170, method 100 obtains vehicular crash data. The vehicular crash data can be obtained from a vehicle crash module, a safety module, and/or other suitable module. In one embodiment, telematics unit 30 obtains the vehicular crash data from a vehicle crash module AACN such as VSM 42 via a vehicle bus network such as communication bus 44. The vehicular crash data may include vehicle speed before crashing, number of occupants, rollover data, location of the vehicle, and/or any other data related to the crash, the vehicle, and/or occupant(s) of the vehicle.

At step 180, method 100 sends the vehicular crash data to the mobile device. In one embodiment, telematics unit 30 sends the vehicular crash data related to the crash, vehicle, and/or occupant(s) of the vehicle obtained in the previous step to mobile device 22 via an established short range wireless communication such as a bluetooth communication. Skilled artisans should appreciate that other embodiments are also possible.

At step 190, method 100 performs an emergency wireless communication about the crash to one or more parties. The emergency wireless communication can be a phone call, a text message, an email, and/or any suitable communication format. It can be one communication (e.g., one phone call, one text message, one email, etc.) or multiple ones such as several phone calls, several text messages, one phone call followed by a text message or email, etc. The content of the emergency wireless communication may be vocal, data communication, or a combination that include a request for help, announcement about the crash, and/or any related information about the crash, the vehicle, and/or occupant(s) of the vehicle. The emergency wireless communication may be sent to an emergency authority, a call center, a contact person related to an occupant of the vehicle, and/or any other parties previously selected by a user of the vehicle.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method for providing a communication about a potential vehicular crash via a vehicle telematics unit and a personal mobile device, comprising the steps of:
    (a) receiving a notification of a potential vehicular crash from a personal mobile device located at the vehicle;
    (b) confirming the occurrence of the crash by the vehicle telematics unit using the received notification and data gathered at the vehicle; and
    (c) providing a wireless communication about the crash to one or more parties when both the notification from personal mobile device and the vehicle telematics unit detect the crash.

2. The method of claim 1, wherein the personal mobile device is a mobile phone equipped with one or more accelerometers.

3. The method of claim 1, wherein step (a) further comprises the step of detecting a potential vehicular crash via the personal mobile device located at the vehicle.

4. The method of claim 1, wherein step (a) further comprises the steps of establishing short range wireless communication between the mobile device and the vehicle telematics unit and sending a communication about the potential crash from the mobile device to the vehicle telematics unit via the short range wireless communication.

5. The method of claim 4, wherein the short range wireless communication is a bluetooth communication.

6. The method of claim 1, wherein step (b) is carried out in response to the detection of the potential vehicular crash by the personal mobile device located at the vehicle.

7. The method of claim 1, wherein step (b) further comprises the step of obtaining crash related data from a vehicle crash module, a safety module, and/or other suitable module by the telematics unit via a vehicle bus network.

8. The method of claim 7, wherein the vehicle crash module is an advanced automatic collision notification (AACN) module.

9. The method of claim 1, wherein the wireless communication of step (c) comprises data related to the crash and the vehicle including at least one of the following: vehicle speed, number of occupants, rollover data, and location of the vehicle.

10. The method of claim 1, wherein the party contacted comprises an emergency authority, a call center, a contact person related to an occupant of the vehicle, and/or any other parties previously selected by a user of the vehicle.

11. A method for providing a communication about a potential vehicular crash via a vehicle telematics unit and a personal mobile device, comprising the steps of:
    (a) monitoring for any vehicular crash via a personal mobile device located at the vehicle;
    (b) detecting a shock event by the mobile device;
    (c) determining that a potential vehicular crash has occurred based on the detected event;
    (d) establishing short range wireless communication between the mobile device and the vehicle telematics unit;
    (e) sending a notification about the potential vehicular crash from the mobile device to the vehicle telematics unit via the established short range wireless communication;
    (f) accessing data from one or more vehicle system modules concerning the potential vehicular crash;
    (g) confirming the vehicular crash using the accessed data;
    (h) obtaining vehicular crash data by the vehicle telematics unit;
    (i) providing the vehicular crash data to the mobile device from the vehicle telematics unit via the established short range wireless communication; and
    (j) performing an emergency wireless communication to one or more parties.

12. The method of claim 11, wherein the mobile device is a mobile phone equipped with one or more accelerometers.

13. The method of claim 11, wherein the short range wireless communication is a bluetooth communication.

14. The method of claim 11, wherein step (f) is performed in response to receiving the notification about the potential vehicular crash.

15. The method of claim 11, wherein the vehicle system of step (g) is an advanced automatic crash notification system.

16. The method of claim 11, wherein the vehicle module of step (g) is a safety module from a list of modules that includes an antilock brake module and a body control module.

17. The method of claim 11, wherein the wireless communication of step (j) comprises data related to the crash and the vehicle including at least one of the following: vehicle speed, number of occupants, rollover data, and location of the vehicle.

18. A telematics unit for using with a personal mobile device to provide a communication about a potential vehicular crash, wherein the vehicle telematics unit includes a processor and computer readable memory that contains instructions that are executed by the processor to carry out the following steps:
(a) receiving a notification of a potential vehicular crash from a personal mobile device located at the vehicle;
(b) confirming the occurrence of the crash by the vehicle telematics unit using the received notification and data gathered at the vehicle and
(c) providing a wireless communication about the crash to one or more parties when both the notification from personal mobile device and the vehicle telematics unit detect the crash.

19. The method of claim 18, wherein the vehicle telematics unit includes a wireless cellular chipset for wireless communication to and from the vehicle, and includes circuitry that establishes a short range wireless communication with the personal mobile device such that the notification is received via the short range wireless communication.

* * * * *